United States Patent [19]
Shibata et al.

[11] Patent Number: 5,212,025
[45] Date of Patent: May 18, 1993

[54] STORAGE BATTERY FOR AUTOMOBILES

[75] Inventors: Osamu Shibata; Naohiro Otake; Kazuyuki Machida; Akihiro Tsubuki; Kenji Nakano, all of Iwaki, Japan

[73] Assignee: Furukawa Denchi Kabushiki Kaisha, Kanagawa, Japan

[21] Appl. No.: 799,529

[22] Filed: Nov. 27, 1991

[30] Foreign Application Priority Data

Nov. 30, 1990 [JP] Japan .................. 2-129443

[51] Int. Cl.$^5$ ............................................ H01M 2/02
[52] U.S. Cl. ............................ 429/120; 429/148; 429/176
[58] Field of Search ............... 429/120, 148, 176, 177

[56] References Cited

U.S. PATENT DOCUMENTS

| | | | |
|---|---|---|---|
| 4,237,202 | 12/1980 | Karpal | 429/148 X |
| 4,435,486 | 3/1984 | Pomaro et al. | 429/176 X |

FOREIGN PATENT DOCUMENTS

| | | | |
|---|---|---|---|
| 63-192664 | 12/1988 | Japan . | |
| 569756 | 6/1945 | United Kingdom | 429/120 |
| 2161317 | 1/1986 | United Kingdom | 429/120 |
| 2183081A | 5/1987 | United Kingdom . | |
| 2207280A | 1/1989 | United Kingdom . | |

Primary Examiner—Stephen Kalafut
Attorney, Agent, or Firm—Armstrong, Westerman, Hattori, McLeland & Naughton

[57] ABSTRACT

A battery container is provided with a battery cover having side walls so that a gap is formed between the side walls of the container and the side walls of the cover. The upper end portion of a bottomed heat-shielding case is inserted into this gap so that the heat-shielding case is detachably attached to the battery container and covers the container and forms a space between the container and the case. The space between the container and case is closed to air outside the case and air convection between the outside air and the air inside the space can be prevented thereby increasing the heat-shielding effect for protecting the storage battery from high temperatures. Additionally, the heat-shielding case is designed to be attached securely to the battery container (1) to make one body therewith, making it easier to mount and dismount them in an automobile engine compartment.

3 Claims, 1 Drawing Sheet

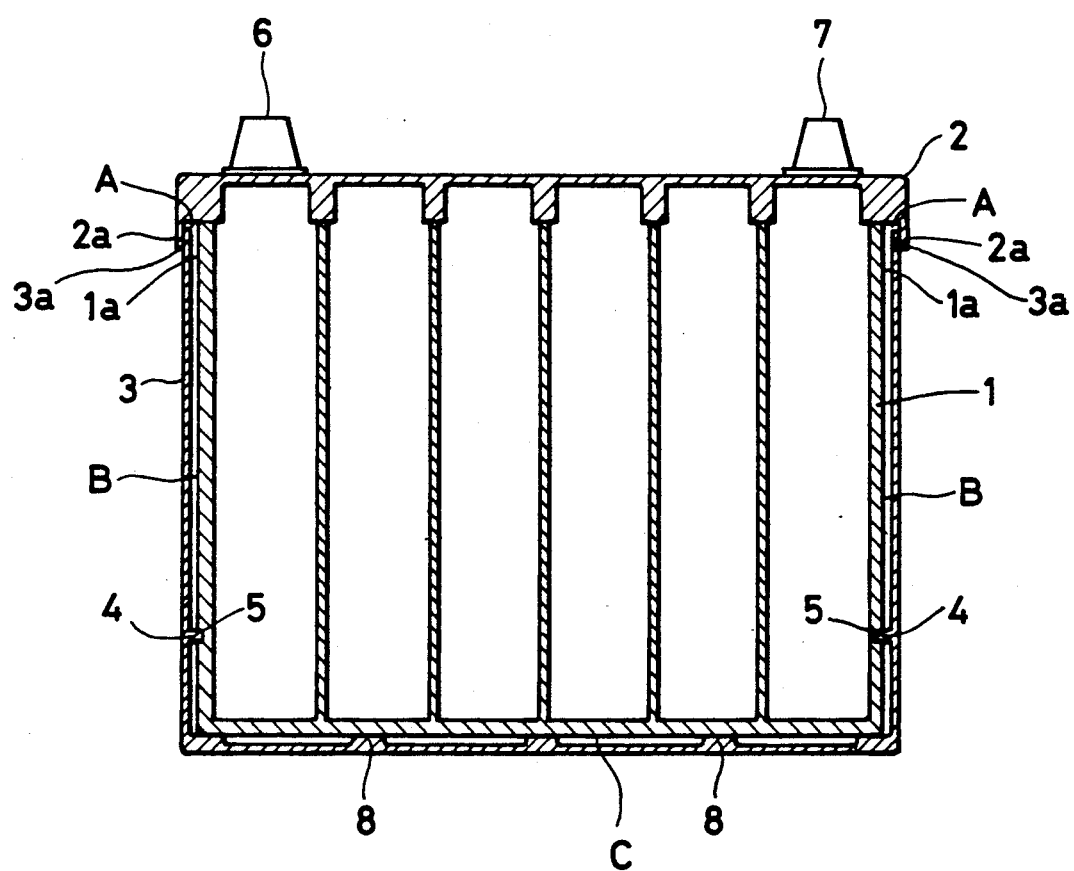

STORAGE BATTERY FOR AUTOMOBILES

BACKGROUND OF THE INVENTION

1. Field of the Invention

This invention relates to a storage battery for automobiles.

2. Description of the Prior Art

Because storage batteries for automobiles are used in the engine compartments of automobiles, it has been conventional, in some cases, to erect a heat-shielding board between the storage battery and the engine to prevent the battery from being directly exposed to the radiation heat of the engine. In other cases, the storage battery is enclosed in a heat-shielding case having one end or both ends thereof open, also for the purpose of protecting the battery from high temperature.

With conventional protective means such as those mentioned above, however, the storage battery and the heat-shielding means require separate handling and it is quite troublesome to mount and dismount them in an automobile. Additionally, both of these conventional protective means have the disadvantage of a low heat-shielding effect resulting from free thermal convection between the air in the space formed between the storage battery and the heat-shielding device and the outside air. The space between the storage battery and the heat-shielding device is open upwardly or in a like direction and thus communicates with the outside air.

SUMMARY OF THE INVENTION

The present invention solves the above-mentioned problems by providing a storage battery having a cover with side walls along its periphery and detachably arranged in a bottomed heat-shielding case in a manner such that the upper end portion of the heat-shielding case fits within the battery cover whereby the heat-shielding case and the storage battery are integrally joined together. The storage battery and heat-shielding case can be handled as a single body. The heat-shielding effect is increased by preventing as much as possible thermal convection between the inside of the case and air outside the case because the upper end portion of the heat-shielding case fits tightly within the battery cover.

BRIEF DESCRIPTION OF THE DRAWING

The drawing shows a sectional view of an embodiment of a storage battery and heat-shielding case for an automobile according to the present invention.

DETAILED DESCRIPTION

One embodiment of the present invention is described below in detail with reference to the accompanying drawing.

In the drawing, a battery container (1) is formed of a synthetic resin such as polypropylene resin and comprises six cell compartments each of which is separated from the others by partition walls. Each cell compartment contains an assembly of plates (not shown in the drawing). A storage battery cover (2) is attached to the upper opening side of the battery container (1) by means of heat sealing or the like. As shown in the drawing, the battery cover (2) is larger than the upper open end of the battery container (1) and has downwardly extending side walls (2a) provided along the periphery thereof. A gap (A) is formed between the side walls (1a) of the battery container (1) and the side walls (2a) of the battery cover (2). Although not shown, the battery cover (2) can be provided with vents, one for each cell compartment. Each vent is provided with a vent plug for closing the vent. A bottomed heat-shielding case (3) is formed of a synthetic resin as are the battery container (1) and the battery cover (2). The heat-shielding case (3) has projections (4) provided on the lower inner sides thereof. When the battery container (1) is put in the heat-shielding case (3), projections (4) engage with corresponding recesses (5) provided on the battery container's side walls (1a) and secure the battery container (1) in position although the heat-shielding case (3) and the battery container (1) remain detachable from each other. Further, the upper end portion (3a) of the heat-shielding case (3) fits within the gap (A) and the space, or gap, (B) formed between the heat-shielding case (3) and the battery container (1) is closed to the outside.

In the drawing, reference numerals (6) and (7) denote the terminals of the storage battery, and reference numeral (8) represents a mount formed on the inner bottom surface of the heat-shielding case (3). The mounts are designed so that a space (C) is formed between the outer bottom surface of the battery container (1) and the inner bottom surface of the heat-shielding case (3).

In the embodiment described above, the space (B) between the battery container (1) and the heat-shielding case (3) is closed to, or shut off from, the outside air. This prevents thermal convection between the outside air and the space (B) and increases the heat-shielding effect for protecting the storage battery from the high temperatures of the air in the engine compartment. In addition, since the heat-shielding case (3) is designed so that it can be attached securely to the battery container to make a unitary body therewith, it is now much easier to mount and dismount them in an automobile.

As described in the foregoing, according to the present invention, the upper end portion of a heat-shielding case is inserted into the gap formed between the side walls of a battery cover and the side walls of a battery container of a storage battery. As a result, the space between the battery container and the heat-shielding case is sealed and convection of the air in the space with the air outside the case is prevented, thereby improving the heat-shielding effect. The heat-shielding case is securely attached to the battery container so that they can be handled easily as a unit for mounting and dismounting in an automobile.

What is claimed is:

1. A storage battery for a motor vehicle comprising a battery container having side walls and a bottom; a battery cover secured to and covering said container and having side walls which project downwardly outside of said container such that a gap is formed between said downwardly projecting side walls and a top portion of side walls of the container; and a bottomed heat-shielding case detachably attached to and surrounding said battery container and having an upper end portion arranged within said gap.

2. The storage battery of claim 1 wherein a space is formed between the battery container and the heat-shielding case, said space being shut off from the environment outside the battery by the upper end portion of the case within the gap.

3. The storage battery of claim 1, wherein the heat-shielding case has projections provided on inner sides thereof, and the battery container has recesses provided on outer sides thereof which engage with said projections and detachably secure said case to said container.

* * * * *